(12) United States Patent
Saotome et al.

(10) Patent No.: US 7,292,000 B2
(45) Date of Patent: Nov. 6, 2007

(54) ANGULAR VELOCITY MEASURING DEVICE AND LEG-MOVING ROBOT

(75) Inventors: Kouji Saotome, Sayama (JP); Noriaki Okamoto, Sayama (JP); Shinyu Hirayama, Sayama (JP); Tomohiro Sakogoshi, Sayama (JP); Yoichi Shimada, Sayama (JP); Shigeto Akahori, Sayama (JP); Kengo Hori, Sayama (JP); Hitoshi Saika, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/584,049

(22) PCT Filed: Jul. 13, 2005

(86) PCT No.: PCT/JP2005/012948

§ 371 (c)(1),
(2), (4) Date: Jun. 22, 2006

(87) PCT Pub. No.: WO2006/009042

PCT Pub. Date: Jan. 26, 2006

(65) Prior Publication Data
US 2007/0152618 A1 Jul. 5, 2007

(30) Foreign Application Priority Data
Jul. 22, 2004 (JP) .............................. 2004-213854

(51) Int. Cl.
*B25J 5/00* (2006.01)
*G01C 19/00* (2006.01)
*G01P 9/00* (2006.01)

(52) U.S. Cl. ................ 318/568.12; 318/609; 318/561; 700/245; 702/141; 702/150; 702/151; 73/497; 73/514.12

(58) Field of Classification Search ................ 318/560, 318/561, 568.12, 609, 610; 73/497, 65.07, 73/514.12; 700/245; 702/141, 150, 151
See application file for complete search history.

(56) References Cited

U.S. PATENT DOCUMENTS 4,628,729 A * 12/1986 Thoone ..................... 73/178 R
5,768,634 A * 6/1998 Nagai et al. .................. 396/54

(Continued)

FOREIGN PATENT DOCUMENTS

JP 04276806 A * 10/1992

(Continued)

*Primary Examiner*—Paul Ip
(74) *Attorney, Agent, or Firm*—Arent Fox LLP (57) ABSTRACT

An angular velocity measuring device (1) includes a first sensor (2) (vibration gyro) and a second sensor (3) (gas rate gyro). The detection output of the first sensor (2) is inputted to a high pass filter (4). Output of the filter (4) is stored and held in time series in a memory (10). Subtraction processing means (11) successively executes processing of subtracting the output of the filter (4) $\omega v'(t-tsd)$ before a predetermined time tsd from the output of the filter (4) $\omega v'(t)$. The value thus obtained is successively added to the output of the second sensor (3) $\omega g(t)$ by addition processing means (12) so as to obtain the measurement value of the angular velocity. Thus, it is possible to provide an angular velocity measuring device capable of giving an angular velocity measurement value having a high response and stability at a reasonable cost.

5 Claims, 7 Drawing Sheets

U.S. PATENT DOCUMENTS

| | | | | |
|---|---|---|---|---|
| 5,805,212 | A * | 9/1998 | Fujiwara | 348/208.8 |
| RE37,374 | E * | 9/2001 | Roston et al. | 318/561 |
| 6,427,131 | B1 * | 7/2002 | McCall et al. | 702/150 |
| 6,527,071 | B1 * | 3/2003 | Villedieu | 180/8.1 |
| 6,618,656 | B2 * | 9/2003 | Kueblbeck et al. | 701/45 |
| 6,666,091 | B2 * | 12/2003 | Hatanaka et al. | 73/504.16 |
| 6,681,196 | B2 * | 1/2004 | Glaser et al. | 702/151 |
| 6,697,758 | B2 * | 2/2004 | McCall et al. | 702/141 |
| 6,980,919 | B2 * | 12/2005 | Ido | 702/150 |
| 7,028,548 | B2 * | 4/2006 | Higuchi et al. | 73/514.12 |
| 7,069,783 | B2 * | 7/2006 | Uehara | 73/514.12 |
| 7,078,874 | B2 * | 7/2006 | Nakai et al. | 318/609 |
| 7,109,636 | B2 * | 9/2006 | Yamashita | 310/316.01 |
| 2002/0077768 | A1 * | 6/2002 | McCall et al. | 702/141 |
| 2002/0103610 | A1 * | 8/2002 | Bachmann et al. | 702/94 |
| 2002/0123857 | A1 * | 9/2002 | Bjorset | 702/151 |
| 2002/0183962 | A1 * | 12/2002 | Glaser et al. | 702/151 |
| 2003/0029239 | A1 * | 2/2003 | Hatanaka et al. | 73/504.16 |
| 2003/0116363 | A1 * | 6/2003 | Villedieu | 180/8.1 |
| 2004/0107780 | A1 * | 6/2004 | Kawai et al. | 73/862.08 |
| 2004/0116836 | A1 * | 6/2004 | Kawai et al. | 600/595 |
| 2004/0125213 | A1 * | 7/2004 | Kawahara | 348/208.5 |
| 2004/0167641 | A1 * | 8/2004 | Kawai et al. | 700/63 |
| 2004/0169636 | A1 * | 9/2004 | Park et al. | 345/156 |
| 2004/0187577 | A1 * | 9/2004 | Higuchi et al. | 73/514.29 |
| 2004/0206164 | A1 * | 10/2004 | Kawai et al. | 73/65.07 |
| 2004/0246769 | A1 * | 12/2004 | Ido | 365/154 |
| 2005/0021176 | A1 * | 1/2005 | Takenaka et al. | 700/245 |
| 2005/0051368 | A1 * | 3/2005 | Takenaka et al. | 180/8.6 |
| 2005/0075755 | A1 * | 4/2005 | Takenaka et al. | 700/245 |
| 2005/0178202 | A1 * | 8/2005 | Uehara | 73/497 |
| 2006/0085111 | A1 * | 4/2006 | Kojima | 701/38 |
| 2006/0195223 | A1 * | 8/2006 | Kawai et al. | 700/245 |
| 2006/0293791 | A1 * | 12/2006 | Dariush | 700/245 |

FOREIGN PATENT DOCUMENTS

| | | |
|---|---|---|
| JP | 9-203637 A | 8/1997 |
| JP | 2000-066722 A | 3/2000 |
| JP | 2002-090151 A | 3/2002 |
| JP | 2005-030767 A | 2/2005 |

* cited by examiner

FIG. 7

ANGULAR VELOCITY MEASURING DEVICE AND LEG-MOVING ROBOT

CROSS-REFERENCE TO RELATED APPLICATION

This application is a National Stage entry of International Application No. PCT/JP2005/012948, filed Jul. 13, 2005, the entire specification claims and drawings of which are incorporated herewith by reference.

FIELD OF THE INVENTION

The present invention relates to an angular velocity measuring device and a leg-moving robot.

BACKGROUND ART

As sensors (rate gyroscopes) for detecting angular velocities, a vibratory gyroscope, a gas rate gyroscope, and the like are well-known. Moreover, for example, as described in Japanese Laid-Open Patent Publication No. 2000-66722 (hereinafter, referred to as patent document 1), there is a known technology in which a movable body is provided therein with a high-sensitivity gyroscope sensor having a relatively narrow detectable angular velocity range and a low-sensitivity gyroscope sensor having a relatively wide detectable angular velocity range, so as to allow selective switching between the low-sensitivity gyroscope sensor and the high-sensitivity gyroscope sensor according to the magnitude of the angular velocity generated in the movable body, whereby the angular velocity can be measured in a wide range.

Now, for example, a biped moving robot is provided therein with an angular velocity measuring device such as a rate gyroscope for its posture control. In this case, although a conventional biped moving robot has performed relatively slow movements such as walking or bowing, in recent years there has been a demand for a rapid movement of the robot such as running or kicking a ball. To make the biped moving robot perform this kind of movements, there is a need to control the posture of the biped moving robot to a desired position quickly and reliably. Therefore, the angular velocity measuring device to be mounted on the robot has been required to be rapid in response with a measurement to a change in angular velocity (to provide a measurement that rapidly changes in response to an abrupt change in angular velocity) and to provide stably high accuracy of a measurement for a steady angular velocity.

Various conventional rate gyroscopes, however, as angular velocity measuring devices have both advantages and disadvantages, and therefore have not been able to fully satisfy the above requirements. Describing this point, a general vibratory gyroscope includes a hard solid such as crystal, which is advantageous to electrical conversion, in a deformable body, namely, a portion deformed by an angular velocity applied to the sensor. Therefore, the vibratory gyroscope is rapid in response to the angular velocity. The vibratory gyroscope, however, is affected by a factor that changes the shape of the deformable body even if it is a disturbance independent of the angular velocity such as a temperature change, if it occurs, and thus it appears as drift in an output of the vibratory gyroscope. On the other hand, a gas rate sensor detects a deflection of a gas stream relative to a pair of heat wires, which are located downstream in a passage, as an angular velocity by generating the gas stream in the passage and using it as a deformable body. Therefore, in the gas rate sensor, changes in the shape of the passage caused by, for example, a thermal expansion or the like will not affect the detection of the angular velocity, unless there is any deflection in the gas stream. The gas stream of the gas rate sensor, however, is inferior in followability to a solid as a deformable body, and therefore it is not adequate to detecting a high-frequency angular velocity.

It is also conceivable to use detected outputs of two sensors different in characteristics, with selective switching between the detected outputs by using the technological concept as described in the patent document 1. If so, however, angular velocity measurements are apt to be discontinuous at the time of switching between the detected outputs of the sensors. In addition, switching between the detected outputs lags behind an abrupt change in angular velocity, and therefore it is hard to secure response with measurements to the angular velocity. Thereby, it is hard to appropriately control quick movements of the biped moving robot even if these measurements are used for the posture control of the biped moving robot.

As angular velocity sensors, which are good in response and generate a stable detected output for a steady angular velocity, there have already known a ring laser gyroscope, a fiber optical gyroscope, and the like. All of them, however, have been expensive in comparison with the vibratory gyroscope and the gas rate gyroscope.

In view of the background set forth in the above, the present invention has been provided. Therefore, it is an object of the present invention to provide an angular velocity measuring device, having high response and stability in angular velocity measurements, at a low price. It is another object of the present invention to provide a leg-moving robot capable of controlling the posture appropriately.

DISCLOSURE OF THE INVENTION

In order to achieve the above object, an angular velocity measuring device according to the present invention comprises: a first sensor for generating a detected output of an angular velocity; a second sensor for generating a detected output of an angular velocity with lower drift of the detected output than in the first sensor; a high-frequency pass filter for being inputted the detected output of the first sensor and outputting higher frequency components than a predetermined frequency in the detected output; storage means for sequentially storing output values of the high-frequency pass filter; subtraction means for sequentially performing operations of subtracting an output value at a time a predetermined time period earlier, which is stored in the storage means, from the output value of the high-frequency pass filter; and addition means for sequentially performing operations of adding a value obtained by the subtraction means to the output value of the second sensor, wherein a value obtained by the addition means is obtained as an angular velocity measurement.

According to the present invention, the detected output of the first sensor is input to the high-frequency pass filter, and therefore the output value of the high-frequency pass filter is produced by removing low frequency components from the detected output of the first sensor. Then, the storage means sequentially stores the output values. In parallel with this, the subtraction means subtracts the output value at the time the predetermined time period earlier from the output value of the high-frequency pass filter. Accordingly, the output value obtained after the subtraction is equivalent to a detected value of a variation in the angular velocity generated in the first sensor within the predetermined time period, in other words, from the time the predetermined time period earlier to the current time. Therefore, the output value obtained after the subtraction does not include the detected output in the first sensor nor drift in the high-frequency pass filter, generated in the period from the activation of the first sensor to the time the predetermined time period earlier than the current time.

As described later, the predetermined time period is extremely short time (for example, a few milliseconds) and therefore the drift of the detected value generated within the predetermined time period is vanishingly low. Moreover, the term "drift" here indicates that the detected value of the angular velocity indicated by the detected output of the first sensor has a difference from a predetermined angular velocity (actual angular velocity) with time. If, for example, a vibratory gyroscope is used as a sensor for detecting the angular velocity, generally there is a need to remove low frequency components from the detected output of the vibratory gyroscope by means of the high-frequency pass filter in order to achieve precise measurement with the vibratory gyroscope. This is because of removing variation in the detected output during rest of the vibratory gyroscope, which has been caused by a mechanical effect resulting from a temperature change or the like. In general, the vibratory gyroscope does not generate a predetermined amount of detected output for a predetermined angular velocity, but generates a predetermined amount of detected output according to an angular velocity from the detected output during rest of the vibratory gyroscope.

Therefore, when a sensor like the vibratory gyroscope is used as the first sensor, the high-frequency pass filter is effective in reducing the difference of the detected output from the predetermined angular velocity. If the low frequency components are removed from the detected output of the first sensor, the detected output corresponding to the angular velocity of the low frequency or a certain angular velocity cannot be obtained, thereby causing drift from the actual angular velocity. Therefore, according to the present invention, the value obtained by the high-frequency pass filter and the subtraction means (hereinafter, sometimes simply referred to as a subtracted value) is regarded as a variation of the actual angular velocity generated within the predetermined time period and the addition means adds the subtracted value to the detected output of the second sensor to obtain a measurement of the angular velocity. In this instance, drift in the detected output of the second sensor is less than that of the first sensor and therefore it is possible to obtain a stable measurement with low drift for the angular velocity of a low frequency or a certain angular velocity. Moreover, it is possible to obtain a measurement reflecting an output characteristic of the first sensor (an output characteristic to a disturbance or a response characteristic to a change in the angular velocity) for the angular velocity of the high frequency, and therefore it is possible to obtain a measurement of the angular velocity with the output characteristic of the first sensor for the angular velocity of the high frequency complemented by the output characteristic of the second sensor.

In the angular velocity measuring device according to the present invention, preferably the first sensor has an output characteristic of a shorter delay in response of the detected output to a change in the angular velocity than in the second sensor and the predetermined time period is set to a time period according to a difference between a delay in response of the first sensor and a delay in response of the second sensor.

According to this, the angular velocity measurement is obtained as one with the drift characteristic and the response characteristic of the detected outputs of the first sensor and the second sensor complementing each other. More specifically, the response of the measurement to the change in the actual angular velocity is substantially equivalent to that of the first sensor and the stability of the measurement in the state where the actual angular velocity is maintained virtually constant is substantially equivalent to that of the second sensor. Therefore, the angular velocity measurement has both the more preferable response of the first sensor and the more preferable stability of the second sensor, thereby achieving good response and stability. Moreover, the predetermined time period can be appropriately set and therefore the accuracy of the angular velocity measurement can be increased while maintaining good response of the angular velocity measurement when a change in the actual angular velocity is relatively rapid.

Furthermore, in the angular velocity measuring device according to the present invention, preferably the first sensor is a vibratory gyroscope and the second sensor is a gas rate gyroscope.

More specifically, the detected output of the vibratory gyroscope is high in response to a change in the angular velocity and the detected output of the gas rate gyroscope is high in stability when the angular velocity is virtually constant. Therefore, with the use of the vibratory gyroscope and the gas rate gyroscope as the first sensor and the second sensor, respectively, both the response and the stability of the angular velocity measuring device according to the present invention can be preferably increased. Moreover, with the use of the vibratory gyroscope and the gas rate gyroscope low in price, generally very precise angular velocity measuring device can be provided at a low price.

Then, a leg-moving robot according to the present invention comprises: two legs extending from an upper body; an angular velocity measuring device including a first sensor for generating a detected output of an angular velocity, a second sensor for generating a detected output of an angular velocity with lower drift of the detected output than in the first sensor, a high-frequency pass filter for receiving an input of the detected output of the first sensor and outputting higher frequency components than a predetermined frequency in the detected output, storage means for sequentially storing output values of the high-frequency pass filter, subtraction means for sequentially performing operations of subtracting an output value at a time a predetermined time period earlier, which is stored in the storage means, from the output value of the high-frequency pass filter, and addition means for sequentially performing operations of adding a value obtained by the subtraction means to the output value of the second sensor, wherein a value obtained by the addition means is obtained as an angular velocity measurement; posture angle estimation means for estimating a posture angle of a predetermined portion at least on the basis of the angular velocity measurement obtained by the angular velocity measuring device; and control means for generating a joint drive command signal of the robot at least on the basis of the posture angle estimated by the posture angle estimation means, wherein a joint actuator for driving the joint of the robot is activated according to the joint drive command signal.

According to the leg-moving robot, the posture angle estimation means estimates the posture angle of the predetermined portion of the robot at least on the basis of the angular velocity measurement obtained by the angular velocity measuring device, and therefore the posture angle of the predetermined portion can be accurately estimated independently of the motion velocity of the predetermined portion. Therefore, by generating the joint drive command signal of the robot at least on the basis of the posture angle and activating the joint actuator of the robot according to the joint drive command signal, the posture of the robot can be appropriately controlled to a desired position, independently of whether the movement of the robot is rapid or slow.

In the angular velocity measuring device, as described above, preferably the first sensor has the output characteristic of a shorter delay in response of the detected output to a change in the angular velocity than in the second sensor and the predetermined time period is set to one according to a difference between a delay in response of the first sensor and a delay in response of the second sensor. Furthermore, preferably the first sensor is a vibratory gyroscope and the second sensor is a gas rate gyroscope.

The leg-moving robot according to the present invention preferably includes an acceleration sensor for measuring accelerations including a gravitational acceleration acting on the robot, wherein the posture angle estimation means estimates the posture angle of the predetermined portion on the basis of the angular velocity measurement obtained by the angular velocity measuring device and the acceleration measurement obtained by the acceleration sensor.

More specifically, although the posture angle of the predetermined portion can be estimated by integrating the angular velocity measurements obtained by the angular velocity measuring device, errors are easily accumulated in the integral of the angular velocity measurements. Therefore, the acceleration sensor is provided in addition to the angular velocity measuring device to estimate the posture angle of the predetermined portion on the basis of the measurements. This enables the accuracy of the estimated value of the posture angle to be increased.

When using the angular velocity measuring device and the acceleration sensor in this manner, the posture angle estimation means preferably obtains the estimated value of the posture angle as described below. Specifically, higher frequency components than a predetermined frequency are sampled (lower frequency components than the predetermined frequency are removed) via a high-frequency pass filter (highpass filter) from the integral of the angular velocity measurements obtained by the angular velocity measuring device and lower frequency components than a predetermined frequency are sampled (higher frequency components than the predetermined frequency are removed) via a low-frequency pass filter (lowpass filter) from the acceleration measurement obtained by the acceleration sensor. Then, the base value of the posture angle of the predetermined portion is calculated on the basis of the lower frequency components sampled from the acceleration measurement, and then the base value is added to the posture angle of the robot of the higher frequency components sampled from the integral of the angular velocity measurements, whereby the estimated value of the posture angle is obtained.

BEST MODE FOR CARRYING OUT THE INVENTION

Figure 1:
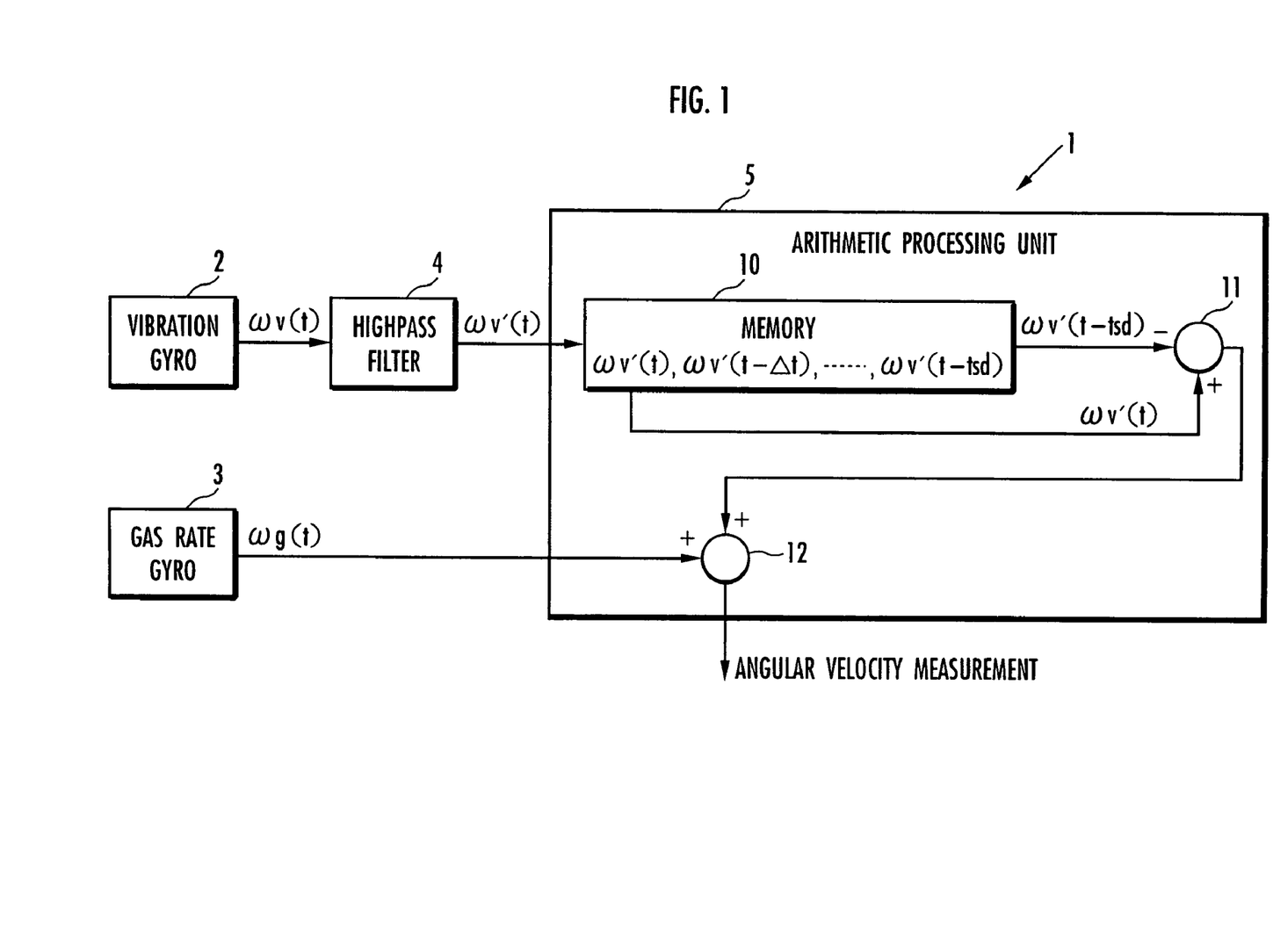
FIG. 1 is a block diagram showing a configuration of an embodiment of an angular velocity measuring device according to the present invention.
Figure 2:
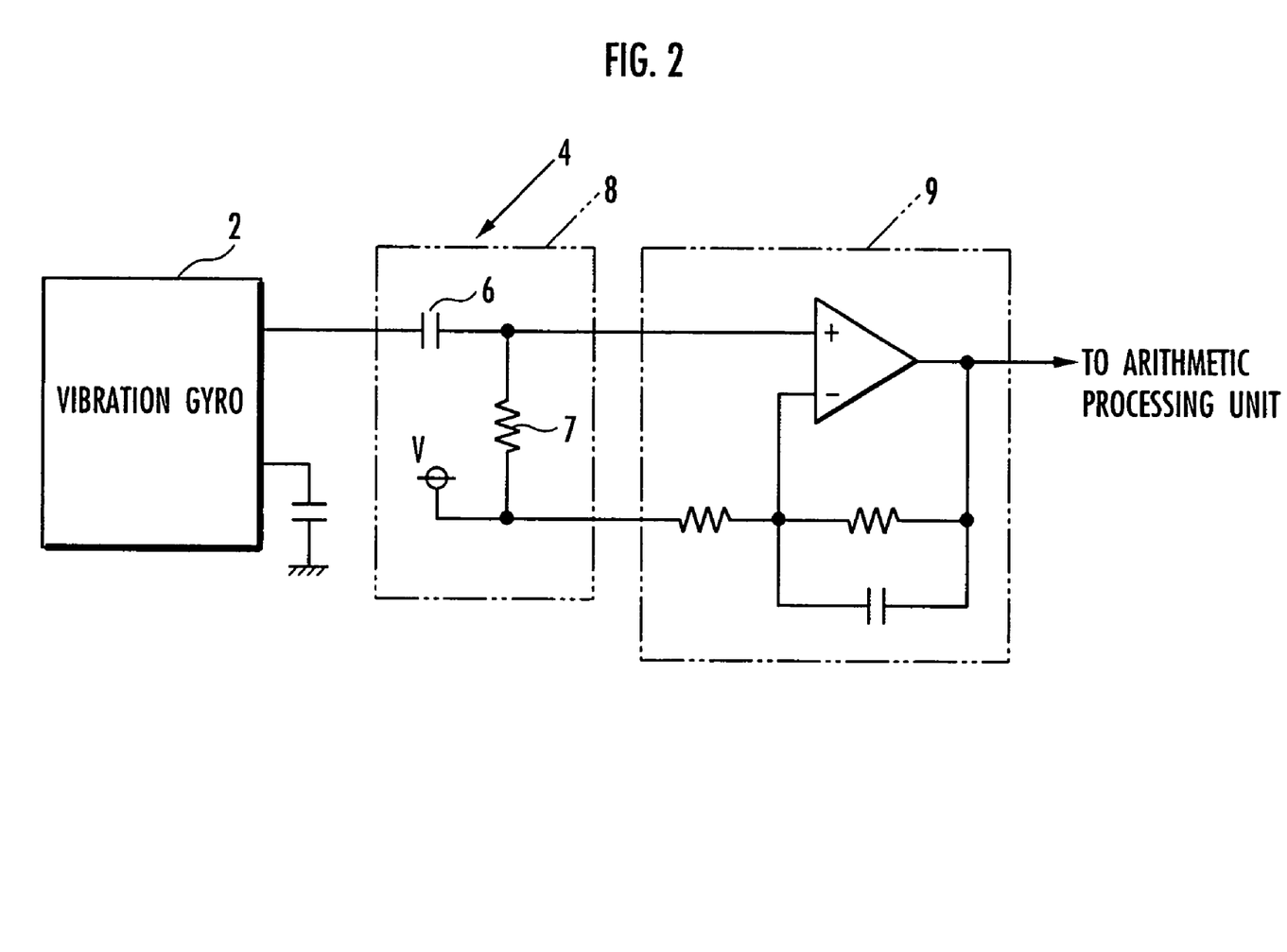
FIG. 2 is a circuit diagram showing a concrete circuit configuration between a vibratory gyroscope and an arithmetic processing unit shown in FIG. 1.
Figure 3:
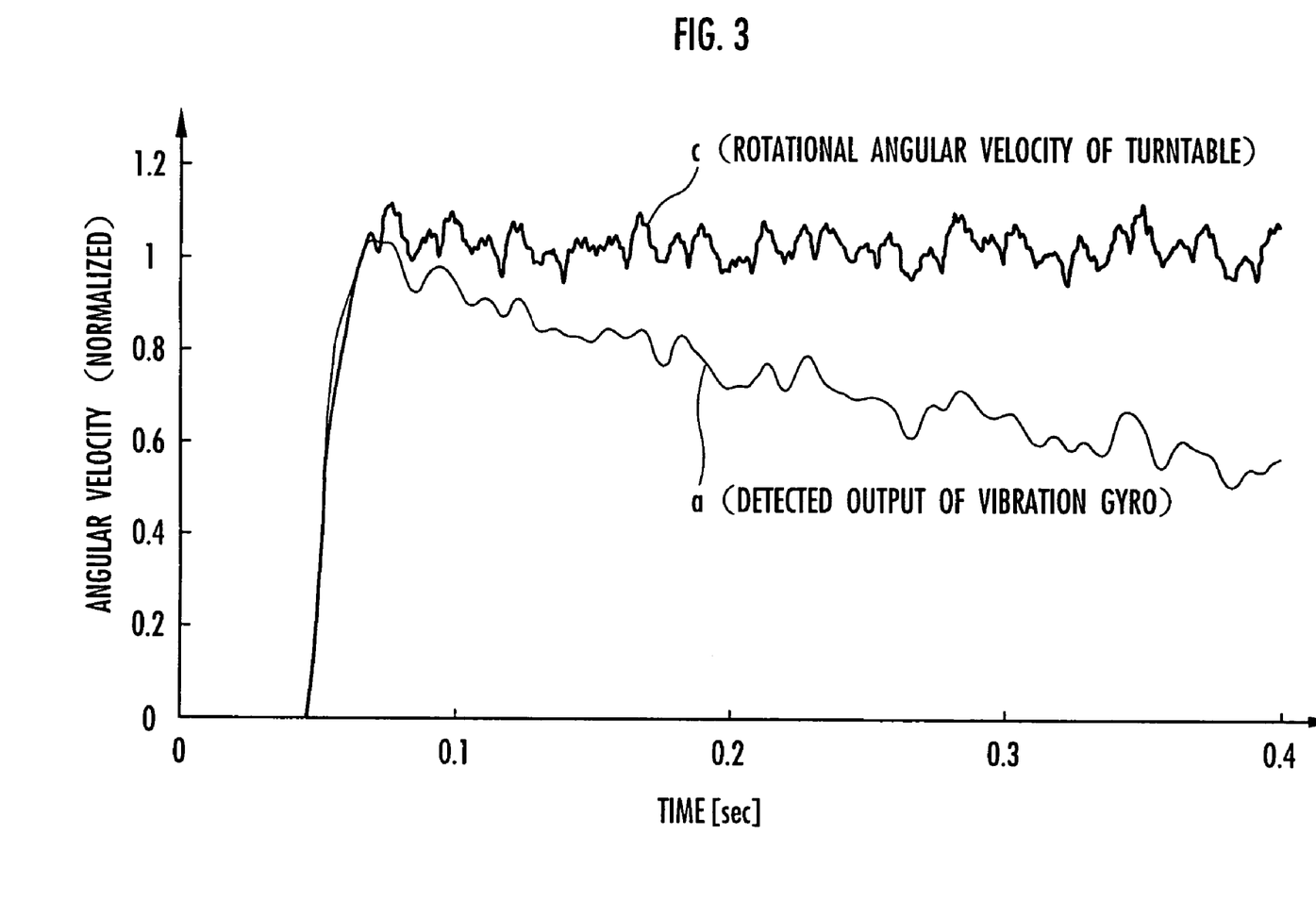
FIG. 3 is a graph showing an output characteristic of the vibratory gyroscope used in the embodiment.
Figure 4:
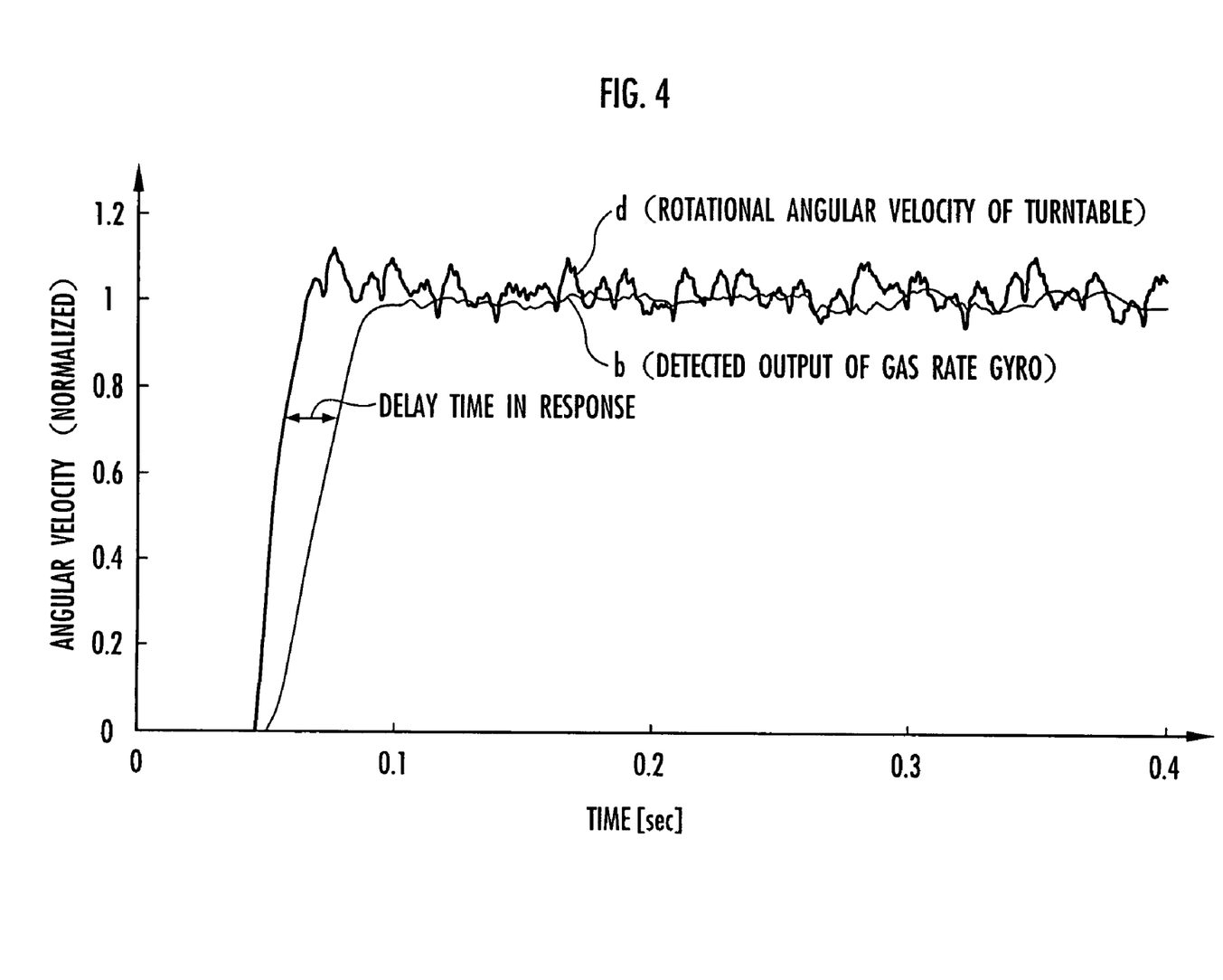
FIG. 4 is a graph showing an output characteristic of a gas rate gyroscope used in the embodiment.
Figure 5:
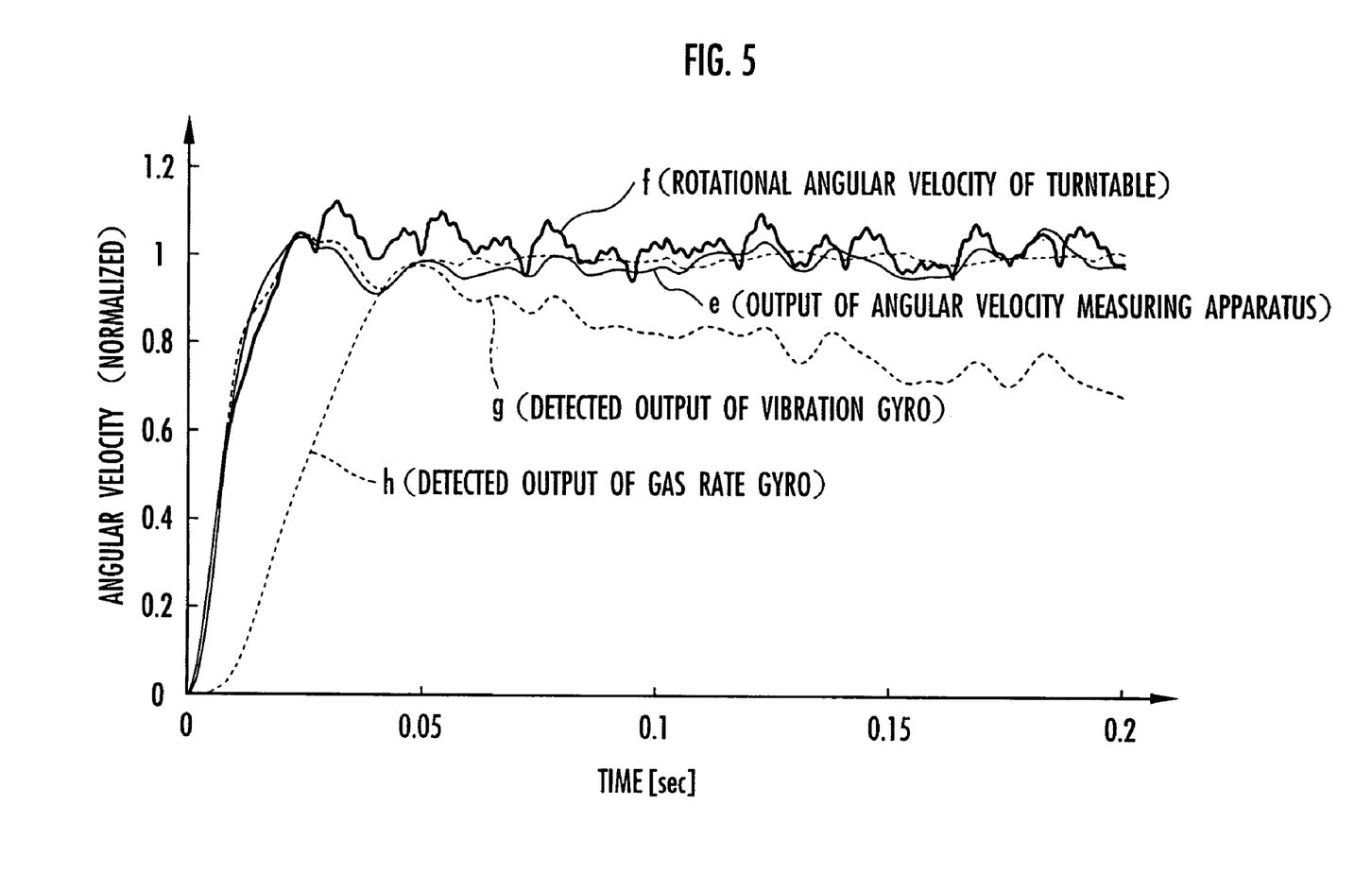
FIG. 5 is a graph showing an output characteristic of the angular velocity measuring device of the embodiment.

An embodiment of an angular velocity measuring device according to the present invention will be described below with reference to FIG. 1 to FIG. 5. FIG. 1 is a block diagram showing a configuration of an angular velocity measuring device according to this embodiment; FIG. 2 is a circuit diagram showing a concrete circuit configuration between a vibratory gyroscope 2 and an arithmetic processing unit 5 shown in FIG. 1; FIG. 3 is a graph showing an output characteristic of the vibratory gyroscope; FIG. 4 is a graph showing an output characteristic of a gas rate gyroscope; and FIG. 5 is a graph showing an output characteristic of the angular velocity measuring device shown in FIG. 1.

Referring to FIG. 1, an angular velocity measuring device 1 of this embodiment includes a vibratory gyroscope 2 as a first sensor, a gas rate gyroscope 3 as a second sensor, a highpass filter 4 (high-frequency pass filter) that receives a detected output $\omega v$ of the vibratory gyroscope 2, and an arithmetic processing unit 5 for processing an output $\omega v'$ of the highpass filter 4 and a detected output $\omega g$ of the gas rate gyroscope 3.

The vibratory gyroscope 2 and the gas rate gyroscope 3 are provided so as to have the same input axis (an angular velocity axis to be detected) (so as to detect the same angular velocity). Although the vibratory gyroscope 2 and the gas rate gyroscope 3 may detect a 1-axis angular velocity, they may detect a 2- or 3-axis angular velocity. When they detect the 2- or 3-axis angular velocity, the detected outputs are a pair (vector quantity) of detected outputs of the 2- or 3-axis angular velocity. Note that the vibratory gyroscope 2 and the gas rate gyroscope 3 may be of well known types.

The highpass filter 4 that receives the detected output $\omega v$ of the vibratory gyroscope 2 is for use in removing low frequency components (including direct-current components) from the detected output $\omega v$ of the vibratory gyroscope 2. The highpass filter 4 passes and outputs higher frequency components than a predetermined frequency (for example, on the order of a few hertz) in the detected output $\omega v$ of the vibratory gyroscope 2 and blocks lower frequency components than the predetermined frequency. The highpass filter 4 is formed by a circuit 8 composed of a capacitor 6 and a resistor 7, for example, as shown in FIG. 2. The output $\omega v'$ of the highpass filter 4 is input to the arithmetic processing unit 5 via a signal amplifier 9 (shown in FIG. 2), which is not shown in FIG. 1, for adjusting an output level, while removing high frequency noise (noise around a few kilohertz) included in the detected output $\omega v$ of the vibratory gyroscope 2.

The detected output $\omega g$ of the gas rate gyroscope 3 is input to the arithmetic processing unit 5 via a signal amplifier, which is not shown, for adjusting an output level.

The output characteristic of the vibratory gyroscope 2 and of the gas rate gyroscope 3 will now be described below with reference to FIG. 3 and FIG. 4, respectively. FIG. 3 and FIG.

4 each show variation with time of an angular velocity (an angular velocity detected value) indicated by a detected output of the gyroscope 2 or 3 by means of a solid line graph a in FIG. 3 and a solid line graph b in FIG. 4, respectively, with the gyroscope 2 or 3 fixed to a turntable (not shown) rotationally driven by an electric motor or the like, caused by changing the rotational angular velocity of the turntable in a stepped manner from zero to a predetermined rotational angular velocity (a constant value). In addition, for each of the gyroscopes 2 and 3, the variation with time of the rotational angular velocity of the turntable detected by a rotational velocity sensor, which is not shown, is indicated by means of a solid line graph c in FIG. 3 or a solid line graph d in FIG. 4. The rotational angular velocity of the turntable indicated by the solid line graph c or d is equivalent to an actual angular velocity (effective angular velocity) applied to the gyroscope 2 or 3.

In FIG. 3 and FIG. 4, the angular velocity along the axis of ordinate is normalized with the target value of the rotational angular velocity of the turntable in a steady state set to 1. The detected outputs of the gyroscopes 2 and 3 each indicate the angular velocity around the axis parallel to the rotation axis (vertical axis) of the turntable. Moreover, the detected output of the vibratory gyroscope 2 shown in FIG. 3 is, more accurately, an output obtained after passing the detected output through the highpass filter 4 (an output of the highpass filter 4).

As shown in FIG. 3, the angular velocity detected value indicated by the detected output of the vibratory gyroscope 2 (the output of the highpass filter 4) follows the change in the rotational angular velocity of the turntable without almost no delay in response when the rotational angular velocity of the turntable changes in a stepped manner. In this manner, the vibratory gyroscope 2 is rapid in response to the change in the applied actual angular velocity. In the steady state where the rotational angular velocity of the turntable is maintained at an almost constant value, drift (output decreases in the steady input state from the characteristic of the highpass filter 4) relative to the actual angular velocity occurs in the angular velocity detected value indicated by the detected output of the vibratory gyroscope 2 (output of the highpass filter 4), and the drift increases with time.

Furthermore, as shown in FIG. 4, the detected output (the angular velocity detected value) of the gas rate gyroscope 3 delays in response to the change in the rotational angular velocity of the turntable due to lower response than the vibratory gyroscope 2 when the rotational angular velocity of the turntable changes in a stepped manner. On the other hand, in the steady state in which the rotational angular velocity of the turntable is maintained at an almost constant value, the detected output (angular velocity detected value) of the gas rate gyroscope 3 is maintained stably and precisely to the actual angular velocity without drift. In this manner, while the detected output of the gas rate gyroscope 3 is low in response to the change in the applied actual angular velocity, it is very precise and stable in the steady state.

Returning to the description of FIG. 1, the arithmetic processing unit 5 includes a memory 10 as storage means for storing outputs $\omega v'$ of the highpass filter 4 sequentially in the time series, a subtraction section 11 for sequentially performing the operations of calculating a difference between two output values to be stored with a time lag of a predetermined time period tsd into the memory 10, and an addition section 12 for adding a value obtained in the subtraction section 11 to a detected output $\omega g$ of the gas rate gyroscope 3. The subtraction section 11 and the addition section 12 correspond to subtraction means and addition means in the angular velocity measuring device according to the present invention, respectively.

The memory 10 sequentially samples the outputs $\omega v'$ of the highpass filter 4 at intervals of a predetermined sampling period $\Delta t$ and stores the time series $\omega v'(t)$, $\omega v'(t-\Delta t)$, $\omega v'(t-2\Delta t)$, . . . , of the sampled output values $\omega v'$ for the predetermined time period tsd. More specifically, the memory 10 stores the output values $\omega v'(t)$, $\omega v'(t-\Delta t)$, . . . , to $\omega'(t-tsd)$ of the highpass filter 4 obtained from the current time t to a time the predetermined time period tsd earlier than the current time t. Incidentally, the oldest output value is deleted from the memory 10 whenever the memory 10 stores a new output value.

The subtraction section 11 sequentially performs the operations of subtracting the output value $\omega v'(t-tsd)$ at the time the predetermined time period tsd earlier, which is stored in the memory 10, from the output value $\omega v'(t)$ at the current time t of the highpass filter 4 stored in the memory 10. More specifically, the subtraction section 11 sequentially performs the operations of subtracting the output value $\omega v'$ stored in the memory 10 at the time the predetermined time period tsd earlier from each of the output value $\omega v'$ of the highpass filter 4 at the time stored in the memory 10. Note here that the predetermined time period tsd is preset to a time period according to the time lag in response of the difference between the detected output of the gyroscope 2 and 3 when the angular velocity changing in a stepped manner is applied to the vibratory gyroscope 2 or the gas rate gyroscope 3. For example, referring to FIG. 4, the predetermined time period tsd is set to a time period from the time when the angular velocity applied to the gas rate gyroscope 3 reaches a value of a predetermined rate of the final steady-state value (almost equivalent to the time when the angular velocity indicated by the detected output of the vibratory gyroscope 2 reaches the value of the predetermined rate) to the time when the angular velocity detected value, which is indicated by the detected output of the gas rate gyroscope 3, reaches the value of the predetermined rate, in other words, the predetermined time period tsd is set to a time period almost equivalent to a delay time in response (approx. 17 msec in the shown example) of the detected output of the gas rate gyroscope 3 relative to the detected output of the vibratory gyroscope 2. The predetermined time tsd is determined beforehand based on experiments, simulations, and the like The addition section 12 sequentially performs the operations of adding the value $\omega v'(t)-\omega v'(t-tsd)$ obtained in the subtraction section 11 correspondingly to the output value $\omega v'(t)$ of the highpass filter 4 at the current time t to the output value $\omega g(t)$ at the current time t of the gas rate gyroscope 3 and sequentially outputs the values obtained in this operation as final angular velocity measurements.

More generally speaking on these operations of the subtraction section 11 and the addition section 12, they can be said to be operations of adding a value which is obtained by subtracting the output value of the highpass filter 4 at the time the predetermined time tsd earlier than the time concerned from the output value $\omega v'$, to the output value $\omega g$ of the gas rate gyroscope 3 at the time concerned, regarding the output value $\omega v'$ of the highpass filter 4 and the output value $\omega g$ of the gas rate gyroscope 3 at each time.

Next, the operations of the angular velocity measuring device 1 of this embodiment will be described below. In this angular velocity measuring device 1, the detected output $\omega v$ of the vibratory gyroscope 2 is input to the highpass filter 4, by which low frequency components (including DC components) are removed from the detected output $\omega v$ of the vibratory gyroscope 2. Therefore, the output ωv' of the highpass filter 4 is an output value of substantially "0" in the state where the rate of change of the detected output ωv of the vibratory gyroscope 2 is sufficiently low (in the state where the actual angular velocity applied to the vibratory gyroscope 2 is constant or its rate of change is sufficiently low). Therefore, drift in the detected output ωv of the vibratory gyroscope 2 has little effect on the output ωv' of the highpass filter 4. This is because the change in the detected output ωv of the vibratory gyroscope 2 caused by drift is moderate (low in the rate of change). Then, the time series ωv'(t), ωv'(t−Δt), ..., to ωv'(t−tsd) of the output value ωv' of the highpass filter 4 are stored in the memory 10 while the subtraction section 11 performs the calculations to obtain the difference between the current output value ωv'(t) of the highpass filter 4 and the output value ωv'(t−tsd) at the time the predetermined time tsd earlier. The difference value ωv'(t)−ωv'(t−tsd) obtained by the subtraction section 11 in this manner precisely matches the variation of the actual angular velocity in the predetermined time period tsd in the state where the detected output ωv of the vibratory gyroscope 2 and consequently the output value ωv' of the highpass filter are changing at a relatively high rate of change (in other words, in the state where the actual angular velocity applied to the vibratory gyroscope 2 is changing relatively rapidly). This is because, as described above, the detected output ωv of the vibratory gyroscope 2 is high in response to the change in the applied angular velocity. Moreover, ωv'(t)−ωv'(t−tsd) becomes 0 or a value near 0 in the state where the rate of change of the detected output ωv of the vibratory gyroscope 2 is constantly low enough.

Then, the value ωv'(t)−ωv'(t−tsd) obtained by the subtraction section 11 is added to the current detected output ωg(t) of the gas rate gyroscope 3 by the addition section 12.

Note here that the detected output ωg of the gas rate gyroscope 3 has a delay in response substantially equivalent to the predetermined time period tsd to the change in the applied actual angular velocity. In the state where the rate of change of the applied angular velocity is relatively high, as described above, the difference value ωv'(t)−ωv'(t−tsd) obtained in the subtraction section 11 precisely matches the variation of the actual angular velocity in the predetermined time period tsd. Therefore, in the state where the rate of change of the actual angular velocity is relatively high, the value ωg(t)+(ωv'(t)−ωv'(t−tsd)) obtained by the addition section 12 is a value achieved by correcting the detected output ωg of the gas rate gyroscope 3 by compensating for the delay in response.

In the state where the rate of change of the applied angular velocity is relatively low, as described above, the value of ωv'(t)−ωv'(t−tsd) approximately equals 0 and therefore the value ωg(t)+(ωv'(t)−ωv'(t−tsd)) obtained by the addition section 12 is substantially equal to ωg(t). In this instance, the detected output ωg of the gas rate gyroscope 3 corresponds to the actual angular velocity precisely and stably in the state where the angular velocity is substantially constant. Therefore, the value ωg(t)+(ωv'(t)−ωv'(t−tsd)) obtained by the addition section 12 corresponds to the actual angular velocity precisely and stably, too.

The angular velocity measuring device 1 of this embodiment sequentially outputs the values ωg(t)+(ωv'(t)−ωv'(t−tsd)) obtained by the addition section 12 as described above as final angular velocity measurements.

An example of the output of the angular velocity measuring device 1 will be described with reference to FIG. 5. FIG. 5 shows variation with time of output of the angular velocity measuring device 1 (an angular velocity measurement) by means of a solid line graph e, with the vibratory gyroscope 2 or the gas rate gyroscope 3 of the angular velocity measuring device 1 fixed to a turntable in the same manner as in FIG. 3 and FIG. 4, caused by changing the rotational velocity of the turntable in a stepped manner from 0 to a predetermined rotational angular velocity (a constant value). In addition, the variation with time of the rotational angular velocity of the turntable detected by a rotational velocity sensor, which is not shown, is indicated by means of a solid line graph f and variations with time of detected outputs (angular velocity detected values) of the vibratory gyroscope 2 and the gas rate gyroscope 3 are indicated by dashed line graphs g and h, respectively. The angular velocity along the axis of ordinate is normalized with the target value of the angular velocity of the turntable in a steady state set to "1." The output of the angular velocity measuring device 1 (angular velocity measurement) and the detected outputs (angular velocity detected values) of the gyroscopes 2 and 3 each indicate the angular velocity around the axis parallel to the rotation axis (vertical axis) of the turntable. Moreover, the detected output graph g of the vibratory gyroscope 2 shown in FIG. 5, more accurately, shows the change in the output after passing the detected output of the vibratory gyroscope 2 through the highpass filter 4 (output of the highpass filter 4).

As shown in FIG. 5, the output of the angular velocity measuring device 1 (angular velocity measurement) follows the change in the rotational angular velocity of the turntable without almost no delay in response, in the same manner as the detected output of the vibratory gyroscope 2 (output of the highpass filter 4), when the rotational angular velocity of the turntable changes in a stepped manner. Moreover, in the steady state in which the rotational angular velocity of the turntable is maintained at an almost constant value, the output of the angular velocity measuring device 1 is maintained stably and precisely to the actual angular velocity without drift, in the same manner as for the detected output of the gas rate gyroscope 3.

In this manner, the output of the angular velocity measuring device 1 of this embodiment is high in response and stability and therefore precisely matches the actual angular velocity, independently of the variation thereof.

Figure 6:
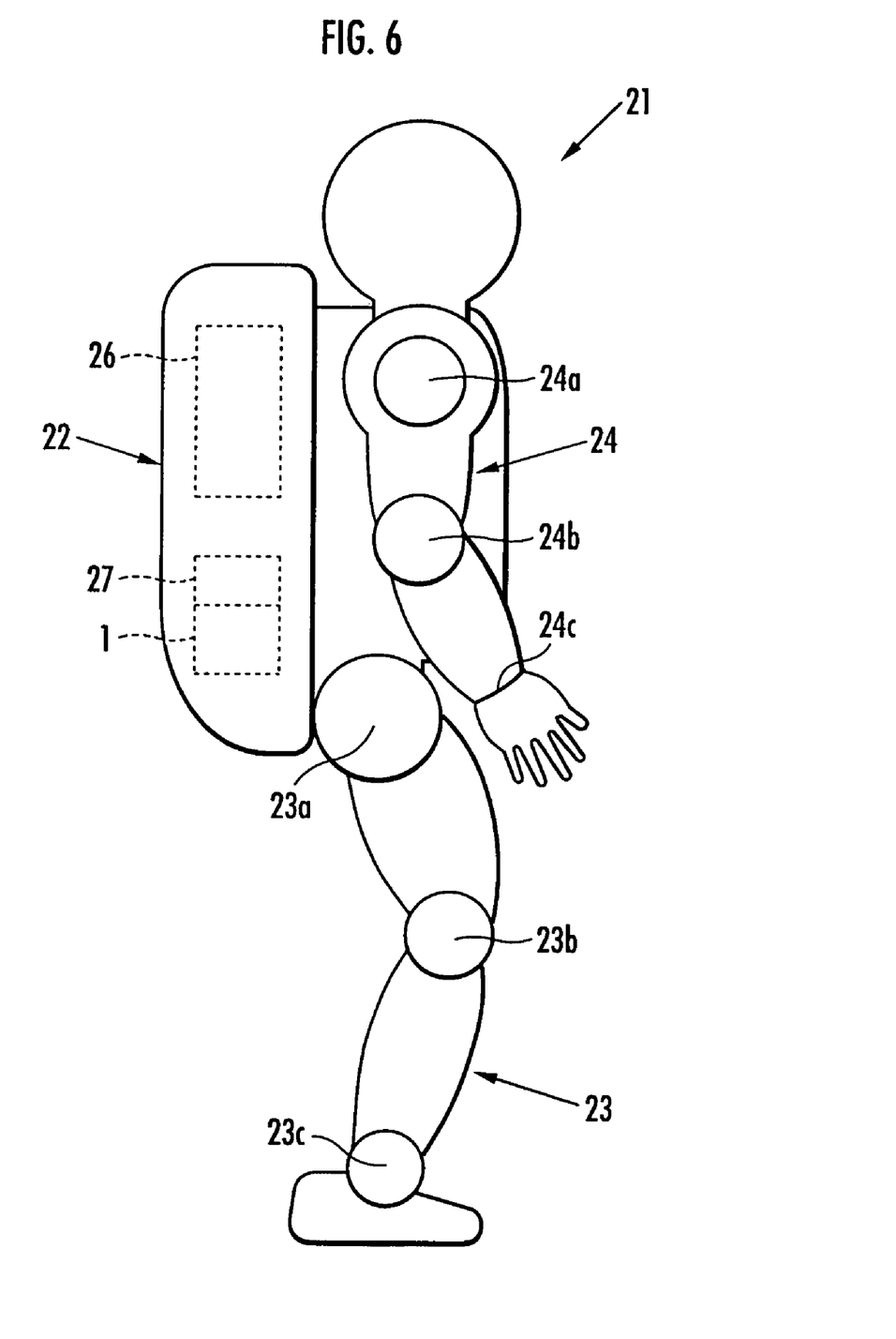
FIG. 6 is an external side view of an embodiment of a leg-moving robot according to the present invention.
Figure 7:
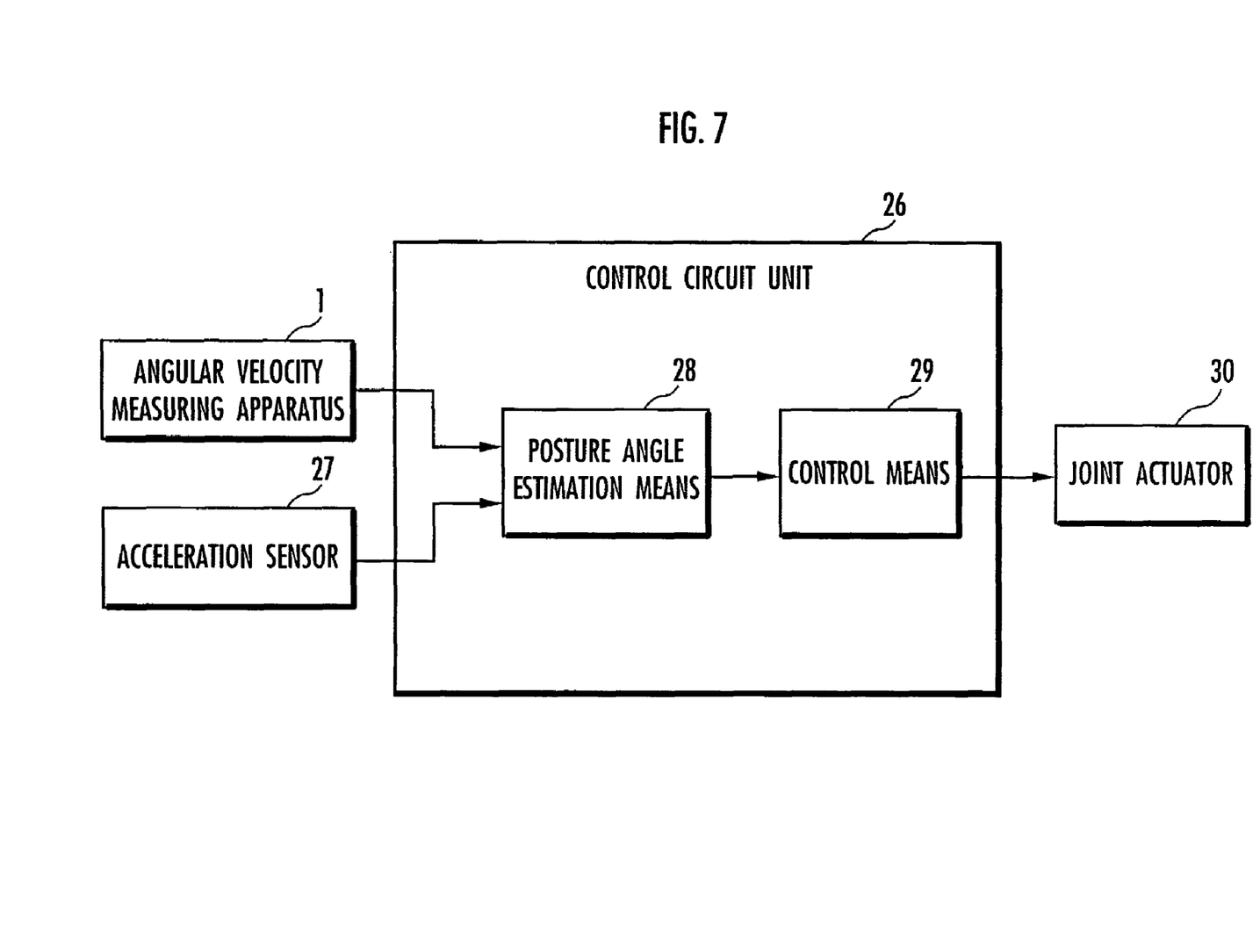
FIG. 7 is a block diagram showing an outline configuration of a control system of the robot of the embodiment.

Subsequently, an embodiment of a leg-moving robot according to the present invention will be described with reference to FIG. 6 and FIG. 7. FIG. 6 is an external side view of a biped moving robot as the leg-moving robot, and FIG. 7 is a block diagram showing an outline configuration of a control system of the biped moving robot.

Referring to FIG. 6, there is shown a biped moving robot 21 (hereinafter, simply referred to as a robot 21) according to this embodiment, which is provided with a leg 23 extending from a lower end of an upper body 22 (base substance) via a hip joint 23a and an arm 24 extending from the side of the upper part of the upper body 22 via a shoulder joint 24a. Although the leg 23 and the arm 24 are shown only regarding those to the right as the robot 21 faces forward in FIG. 6, the robot 21 is provided with a pair of legs 23 and a pair of arms 24 on the right and left sides. The upper body 22 corresponds to a predetermined region in the biped moving robot according to the present invention.

Each leg 23 includes a knee joint 23b and an ankle joint 23c in the direction toward the tip of the leg 23 in this order in addition to the hip joint 23a, and these joints 23a to 23c can rotate around one or a plurality of axes. Similarly, each arm 24 includes an elbow joint 24b and a wrist joint 24c in the direction toward the tip of the arm 24 in this order in addition to the shoulder joint 24a, and these joints 24a to 24c can rotate around one or a plurality of axes.

Although not shown in FIG. 6, these joints 23a to 23c and 24a to 24c of the leg 23 and the arm 24 are provided with joint actuators such as electric motors, respectively. The "joint actuator" indicated by a reference numeral 30 in FIG. 7, which is described later, generically represents these plurality of joint actuators.

On the rear of the upper body 22 of the robot 21, there are mounted a control circuit unit 26 including a microcomputer (not shown), the angular velocity measuring device 1 according to the embodiment, and an acceleration sensor 27. In this instance, the angular velocity measuring device 1 measures angular velocities around three axes in the up/down direction, the forward/backward direction, and the right/left direction and outputs the set of angular velocity measurements around three axes to the control circuit unit 26. Similarly, the acceleration sensor 27 measures accelerations along the three axes in the up/down direction, the forward/backward direction, and the right/left direction and outputs the set of acceleration measurements in the three axes to the control circuit unit 26. When the robot 21 is in a standing posture, the up/down direction of the upper body 22 matches the vertical direction (gravity direction).

Additionally, the arithmetic processing unit 5 of the angular velocity measuring device 1 or the same and the highpass filter 4 may be incorporated in the control circuit unit 26. In this instance, the output of the highpass filter 4 and the detected output of the gas rate gyroscope 3, or the detected outputs of the vibratory gyroscope 2 and the gas rate gyroscope 3 may be input to the control circuit unit 26 via an A/D converter.

As shown in FIG. 7, the control circuit unit 26 includes posture angle estimation means 28 for estimating a posture angle of the upper body 22 (the tilt angle to the vertical direction (gravity direction)) of the robot 21 on the basis of the outputs of the angular velocity measuring device 1 and the acceleration sensor 27, and control means 29 for generating joint drive command signals for the joints 23a to 23c and 24a to 24c of the robot 21 on the basis of the posture angle of the upper body 22 estimated by the posture angle estimation means 28 and outputting them to the joint actuators 30, respectively. The joint drive command signals generated by the control means 29 are signals indicating rotation angles of the joint actuators 30.

In the robot 1 according to this embodiment, the control circuit unit 26 sequentially generates the joint drive command signals by means of the control means 29 while sequentially performing the operations of estimating the posture angle of the upper body 22 of the robot 21 by means of the posture angle estimation means 28. In this instance, the posture angle estimation means 28 sequentially calculates base values of the posture angle (the tilt angle to the vertical direction) of the upper body 22 from the component obtained by removing higher frequency components than a predetermined frequency by means of a lowpass filter (not shown) from the acceleration measurement (equivalent to acceleration components caused by the gravity), which is output from the acceleration sensor 27. Furthermore, the posture angle estimation means 28 sequentially samples components each obtained by removing lower frequency components (including DC components) than a predetermined frequency by means of a highpass filter (not shown) from the posture angle of the upper body 22 (the tilt angle to the vertical direction) obtained by integrating the angular velocity measurements output from the angular velocity measuring device 1, and then sequentially performs calculations of adding the base value to the sampled value to obtain the estimated value of the posture angle of the upper body 22.

Additionally, the value obtained by integrating the angular velocity measurements output from the angular velocity measuring device 1 may be obtained as an estimated value of the posture angle of the upper body 22. Errors of the angular velocity measurements, however, are accumulated in the integral of the angular velocity measurements. Moreover, the posture angle of the upper body 22 obtained from the acceleration measurements of the acceleration sensor 27 easily has an error in consequence of the motion acceleration (acceleration of an inertia force) in the state where the robot 21 is performing a movement. Therefore, in this embodiment, the estimated value of the posture angle of the upper body 22 has been calculated as described above, using both the acceleration measurements of the acceleration sensor 27 and the angular velocity measurements of the angular velocity measuring device 1.

The control means 29 then controls the posture of the robot 21 as described below, for example. Specifically, target gait generation means, which is not shown, supplies the control means 29 with target data (for example, the target position and target posture angle of the tip of each leg 23 and each arm 24, the target position and target posture angle of the upper body 22, and the like), which defines the spatial target position and target posture angle of each portion of the robot 21. The control means 29 then compares the target posture angle of the upper body 22 of the robot 21 determined by the target data with the posture angle of the upper body 22 estimated by the posture angle estimation means 28 and corrects the target data so that the estimated value of the posture angle approximates the target posture angle. Furthermore, the control means 29 generates joint drive command signals of the joints 23a to 23c and 24a to 24c of the robot 21 from the corrected target data and outputs them to the joint actuators 30. At this moment, the joint actuators 30 operate according to the supplied joint drive command signals, thereby performing the posture control of the robot 21.

As described hereinabove, in the robot 21 of this embodiment, the angular velocity measuring device 1 and the acceleration sensor 27 are used to estimate the posture angle of the upper body 22 of the robot 21. In this instance, particularly the angular velocity measuring device 1 is high in response and stability as described above, and therefore the estimated value of the posture angle of the upper body 22 can be precisely obtained by processing of the posture angle estimation means 28. Accordingly, the posture control of the robot 21 can be preferably performed.

While the posture angle of the upper body 22 of the robot 21 has been estimated in this embodiment, the posture angle of another region such as, for example, a thigh (a link between the hip joint 23a and the knee joint 23b) of each leg 23 of the robot 21 may be estimated, too. Since the rotation angle of each joint of the robot 1 can be grasped by using, for example, the joint drive command signal or an appropriate sensor, the posture angle of one region (link) of the robot 21 is estimated and thereby the posture angles of other regions of the robot 21 can also be estimated by geometric calculations.

INDUSTRIAL APPLICABILITY

As described hereinabove, the angular velocity measuring device according to the present invention is capable of measuring angular velocities with high response and stability while using inexpensive sensors, and therefore it is adapted for use in measuring angular velocities of various physical objects. Particularly, since high response and stability can be achieved in the angular velocity measurement by using inexpensive sensors, the angular velocity measuring device can be effectively utilized for the posture control of the leg-moving robot.

The invention claimed is:

1. An angular velocity measuring device comprising: a first sensor for generating a detected output of an angular velocity; a second sensor for generating a detected output of an angular velocity with lower drift of the detected output than in the first sensor; a high-frequency pass filter for being inputted the detected output of the first sensor and outputting higher frequency components than a predetermined frequency in the detected output; storage means for sequentially storing output values of the high-frequency pass filter; subtraction means for sequentially performing operations of subtracting an output value at a time a predetermined time period earlier, which is stored in the storage means, from the output value of the high-frequency pass filter; and addition means for sequentially performing operations of adding a value obtained by the subtraction means to the output value of the second sensor, wherein a value obtained by the addition means is obtained as an angular velocity measurement.

2. The angular velocity measuring device according to claim 1, wherein the first sensor has an output characteristic of a shorter delay in response of the detected output to a change in the angular velocity than in the second sensor and the predetermined time period is set to a time period according to a difference between a delay in response of the first sensor and a delay in response of the second sensor.

3. The angular velocity measuring device according to claim 1, wherein the first sensor is a vibratory gyroscope and the second sensor is a gas rate gyroscope.

4. A leg-moving robot comprising:
   two legs extending from an upper body;
   an angular velocity measuring device, which includes: a first sensor for generating a detected output of an angular velocity; a second sensor for generating a detected output of an angular velocity with lower drift of the detected output than in the first sensor; a high-frequency pass filter for receiving an input of the detected output of the first sensor and outputting higher frequency components than a predetermined frequency in the detected output; storage means for sequentially storing output values of the high-frequency pass filter; subtraction means for sequentially performing operations of subtracting an output value at a time a predetermined time period earlier, which is stored in the storage means, from the output value of the high-frequency pass filter; and addition means for sequentially performing operations of adding a value obtained by the subtraction means to the output value of the second sensor, wherein a value obtained by the addition means is obtained as an angular velocity measurement;

posture angle estimation means for estimating a posture angle of a predetermined portion at least on the basis of the angular velocity measurement obtained by the angular velocity measuring device; and control means for generating a joint drive command signal of the robot at least on the basis of the posture angle estimated by the posture angle estimation means, wherein a joint actuator for driving the joint of the robot is activated according to the joint drive command signal.

5. The leg-moving robot according to claim 4, further comprising an acceleration sensor for measuring accelerations including a gravitational acceleration acting on the robot, wherein the posture angle estimation means estimates the posture angle of the predetermined portion on the basis of the angular velocity measurement obtained by the angular velocity measuring device and the acceleration measurement obtained by the acceleration sensor.

* * * * *